May 28, 1963  A. M. THOMPSON ETAL  3,091,134

INDEXING MECHANISM

Filed Dec. 7, 1961  2 Sheets-Sheet 1

INVENTORS
ARNOLD M. THOMPSON
VICTOR W. GIDEON by Norman Gerlach
Atty.

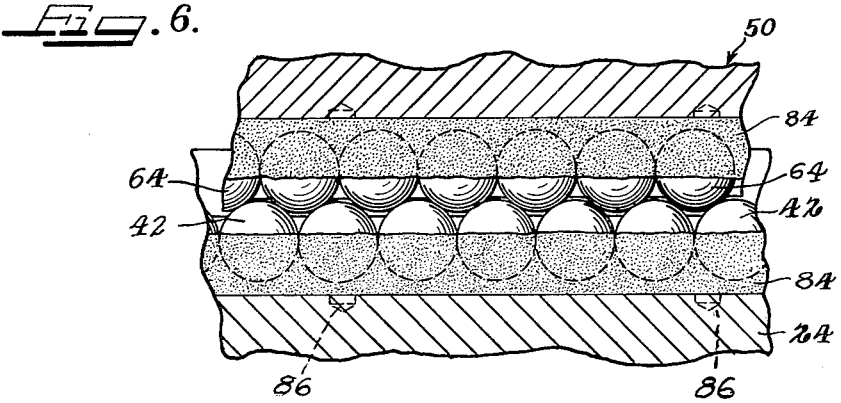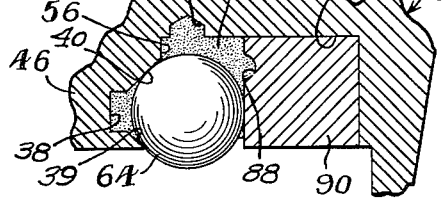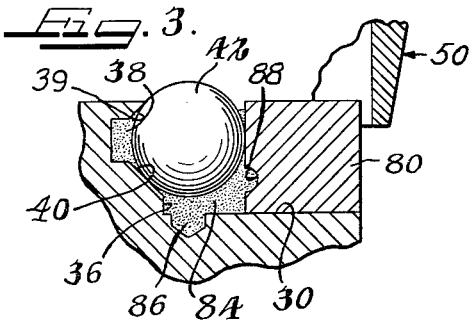

3,091,134
INDEXING MECHANISM
Arnold M. Thompson, Wheaton, and Victor W. Gideon, Chicago, Ill., assignors to Thompson Designs, Inc., Franklin Park, Ill., a corporation of Illinois
Filed Dec. 7, 1961, Ser. No. 157,724
8 Claims. (Cl. 74—826)

The present invention relates to indexing mechanisms and has particular reference to indexing mechanisms of the type shown and described in a copending United States patent application of John G. Hoeger, Serial No. 54,615, filed on September 8, 1960 and entitled "Indexing Mechanism," and over which mechanism the present one is an improvement.

An indexing mechanism of the type shown and described in the above-mentioned application is designed for the purpose of supporting a workpiece and of changing the angular position thereof so that various metal working operations may be performed thereon at angularly spaced regions around the workpiece. Indexing mechanisms or fixtures of this character are widely used in the metal working field and are known as indexing plates or tables, including as they do, a rotary plate or table mounted on turret fashion on a stationary base. The angular position of the plate may be varied either by the use of a circular scale and pointer device, or by indexing instrumentalities whereby the plate or table may be released, rotated on its bearing relatively to the base, and thereafter locking or secured in the desired angular position. The degree of accuracy afforded by an indexing mechanism or fixture of this type is, generally speaking, commensurate with the cost of the fixture and, in instances where a high degree of accuracy is desired, the complexity of the fixture is such as to make the same prohibitive from a cost point of view.

Insofar as the specific indexing mechanism of the above-mentioned patent application is concerned, the mechanism was designed to afford a high degree of accuracy in indexing the plate or table and at an extremely low cost as compared to prior mechanisms to accomplish the same purpose. Accordingly, the mechanism depended for its efficiency and low cost upon the accurate placement of two series or circular rows of circumferentially arranged spherical hardened steel balls, with the balls of each row making tangential contact under pressure, each with an adjacent ball on each side thereof. The extremely small tolerances which exist in connection with the manufacture of commercial ball bearings and the uniformity of elasticity thereof render such bearing balls entirely satisfactory for use and, when so used, the fundamental concept of operation is based upon the consideration that any irregularities which may exist in the construction of the individual balls, and which to begin with, are extremely small due to the fine tolerances associated with ball bearing manufacture, are divided over the entire linear circular extent of the series of balls and are thus reduced practically to nothingness in the overall pattern of mating graduations.

It has been found that, in connection with the indexing mechanism of the above-mentioned patent application, at least one serious limitation is attendant upon the construction and use of the mechanism, this limitation being predicated upon the inability to maintain the balls of the two circular rows of balls fixedly anchored in the plate or table and in the base against circumferential shifting. Because of the fact that all of the balls in each row are firmly compressed in the circular row, with each ball making tangential point contact with two adjacent balls, there is no possibility of individual circumferential shifting of any one ball in the row so that the magnitude of the indexing graduations of which the mechanism is capable does not vary and remains equal at all times. However, despite the fact that the balls of each circular row of balls, as a whole, are clamped in position on the plate or base, as the case may be, under an appreciable degree of pressure and are firmly compressed against one another so that they effectively present a solid metal column or closed ring of metal around the circular row, it has been found that, under certain conditions of use of the mechanism, there is a tendency for the entire circular row of balls to shift circumferentially in one direction or the other bodily, thus destroying the accuracy of the mechanism and rendering the same unfit for further use. Obviously, in a mechanism where extreme accuracy is required, the slightest degree of circumferential shifting of either circular row of balls cannot be tolerated.

Such circumferential shifting bodily of either circular row of balls is not necessarily a result of rough handling or usage of the mechanism. It takes place incident to descent of the upper plate upon the lower base in the normal course of use of the mechanism. It may take place under normal manual pressure when the mechanism is designed for manually controlled indexing operations. It is more apt to take place when the mechanism is designed for automatic or semi-automatic operations, as for example, when the movements of the upper plate or table are pneumatically or hydraulically controlled. The off-center impact of the balls in the upper circular row of balls with the balls in the lower circular row of balls on either side of a dead center will, by a camming action, apply oppositely directed circumferential thrusts to both rows of balls and, whichever series of balls is less securely anchored in position, will shift accordingly. At no time is this circumferential thrust the result of any one pair of contacting off-center balls. Invariably, due to the equal spacing of the balls and to their equality in number in the two rows, respectively, the circumferential thrust which is applied to either row of balls, or to both rows thereof, is the cumulative thrust of all of the contacting pairs of balls circumferentially around the series.

The present invention is designed to overcome the above-noted limitation that is attendant upon the construction and use of indexing mechanisms or fixtures of the type shown and described in the above-mentioned patent application and, accordingly, there is contemplated the provision of a novel means for securely anchoring the balls of each circular row, i.e., in the movable plate or table and in the fixed immovable base, respectively, against circumferential shifting in either direction regardless of the rough usage to which the mechanism may be put, or of the degree of clamping pressure which may be brought to bear by power-initiated means upon the fixed and movable members of the indexing mechanism.

The provision of a novel means for preventing circumferential shifting of either circular row of balls in an indexing mechanism or fixture of the character under consideration, as briefly outlined above, being among the principal objects of the invention, it is contemplated that in carrying out this object the balls be confined within a circular channel which extends around the particular part with which they are associated, i.e., either the upper indexing plate or the lower fixed base, that they be securely clamped against the walls of such channel, and that, furthermore, the channel be partially filled with a low melting point bonding substance possessing an appreciable degree of hardness and resistance to molecular shifting, with the balls having their base regions embedded in such substance with only limited portions thereof exposed for cooperation with the similarly exposed limited regions of the counterpart series of balls.

It is further contemplated according to the present invention that the individual balls of each series be clamped within the channel in which they are disposed in such a manner that each ball makes a three-point contact with the channel side walls, the three points of contact being coplanar and spaced apart approximately 120° on the spherical surface of the ball. Wide interfacial contact areas are provided between the bonding substance and the channel walls and bottom so that there will be no tendency for circumferential shifting of the substance around the channel and, as a further measure to guard against such circumferential shifting of the substance and the partially embedded balls, reaction pockets are formed in one of the channel walls for flow of the bonding substance.

Movable indexing plates and fixed base plates constructed according to the principles of the present invention, as hereinbefore outlined briefly, are devoid of movable clamping rings, fastening screws and other movable parts and the assembly which holds the balls of each series is, for all intents and purposes, an integral unit having no moving parts whatsoever. Therefore, there can be no loosening of parts and, in the assembly thereof, there can be no improper adjustment of parts. Once the assembly has been made, the same is a permanent one and is designed to last throughout the useful life of the indexing fixture.

A still further advantage of the present invention resides in the fact that the constituent parts of the assembly which comprises either the upper movable indexing table or the lower fixed base are initially machined on a precision basis to have interfitting or coacting surfaces which, when brought together in the assembly process, meet squarely and establish predetermined positions for the various parts, including the circular series of balls associated therewith, so that when the assembly is completed, all of the balls will lie in their proper positions in the series and all of them will be equally compressed with no chance for misalignment or displacement of the same either vertically, horizontally, radially, or in any other direction.

Numerous other objects and advantages of the invention will become readily apparent as the nature of the invention is better understood.

In the accompanying two sheets of drawings forming a part of this specification, a preferred embodiment of the invention has been shown.

In the drawings:

FIG. 3 is an enlarged detail sectional view of a portion of the structure shown in FIG. 2;

FIG. 4 is a detail sectional view similar to FIG. 3 showing another limited portion of the structure of FIG. 2;

FIG. 5 is an enlarged fragmentary sectional view taken substantially along the line 5—5 of FIG. 2;

FIG. 6 is a sectional view similar to FIG. 3 showing the parts engaged; and

FIG. 7 is a fragmentary plan view of a base plate assembly employed in connection with the present invention.

Figure 1:
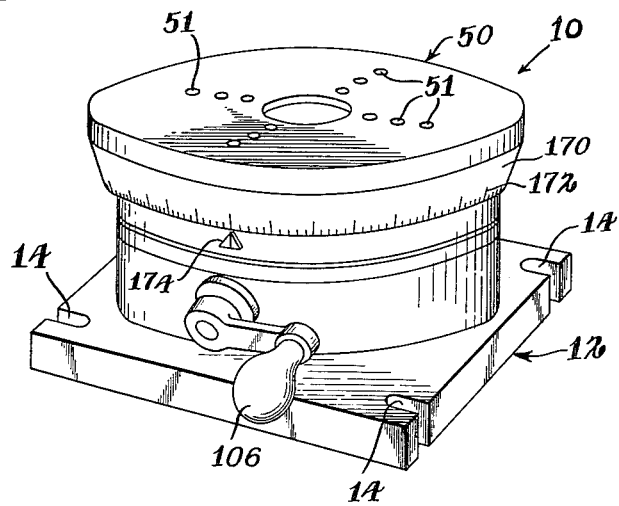
FIG. 1 is a perspective view of an indexing mechanism or fixture embodying the principles of the present invention.
Figure 2:
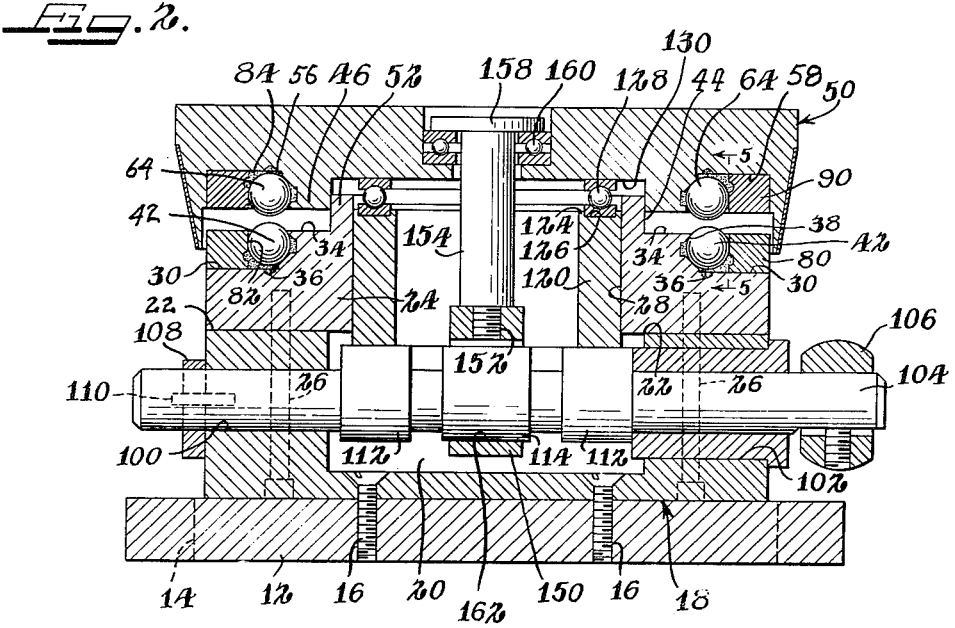
FIG. 2 is an enlarged sectional view taken substantially centrally and vertically through the mechanism of FIG. 1 and showing the principal parts of the mechanism in their disengaged position.

Referring now to the drawings in detail and in particular to FIGS. 1 to 3, inclusive, an indexing mechanism or fixture embodying the principles of the present invention has been designated in its entirety at 10. The fixture 10 is of the same general type shown and described in the above-mentioned copending application Serial No. 54,615, and it also is similar in its design, construction and function to the fixture of such application. The fixture 10 involves in its general organization a base block 12 of generally rectangular configuration and having marginally disposed notches 14 formed therein and by means of which it may readily be mounted on a worktable or other working surface of a machine tool or the like. Fixedly secured to the upper face of the base block 12 by means of anchoring screws 16 or the like is a base casting 18 which is preferably of cylindrical design and embodies a central circular socket or well 20 in the upper face thereof. The base casting 18 thus provides an upper flat annular face 22.

A stationary lower supporting member 24 is secured to the annular upper face of the base casting 18, such member hereinafter for convenience being referred to as the base plate. Suitable anchoring screws 26 are provided for the purpose of securing the base plate in position on the base casting. The base plate 24 is in the form of an annular ring which has a vertical central cylindrical bore 28 therethrough. It further is provided with a stepped outer surface configuration. The stepped surface configuration of the base plate provides a lower upwardly facing annular land surface 30, and an upper upwardly facing annular land surface 34.

The lower land surface 30 extends outwardly from an adjacent cylindrical wall surface 36. The wall surface 36 is formed with a continuous V-shaped trough 38 therearound, the trough presenting inclined trough sides 39 and 40 (see FIG. 3) against which there is adapted to be frictionally clamped a series of lower locating balls 42, the nature and function of which will be described presently.

The upper land surface 34 extends outwardly from an adjacent cylindrical surface 44 and these two last mentioned surfaces provide an annular recess for reception of a downwardly projecting circular boss 46 which is formed on the lower face of a generally circular indexing plate 50 positioned above the base plate 24 coaxially therewith and mounted for rotation relative thereto in either direction. Threaded holes 51 may be provided in the upper face of the indexing plate 50 to facilitate clamping of a workpiece to the plate. However, other work clamping means, such as a magnetic chuck device or the like, may be employed if desired.

The upper indexing plate 50 is maintained in axial alignment with the lower base plate 24 by means of an upwardly projecting piloting rim 52 which extends above the upper land surface 34 and projects into the circular boss 46 with a close frictional fit. The indexing plate 50 is capable of limited vertical axial movement toward and away from the lower base plate 24 for purposes that will become clear presently.

The indexing plate 50 is provided on its underneath side with an annular peripheral groove 54 establishing a cylindrical side wall 56 and a groove bottom 58. The side wall 56 corresponds in function to the cylindrical wall surface 36 of the base plate 24 and it also is provided with a continuous V-shaped trough 38 having inclined trough sides 39 and 40 against which there is adapted to be frictionally clamped a series of upper locating balls 64 similar to the series of balls 42.

The disposition and number of the circumferentially arranged series of balls 42 within the annular recess afforded by the two surfaces 30 and 36 is precisely the same as the disposition of the circumferentially arranged series of balls 64 within the annular recess afforded by the surfaces 56 and 58 and, therefore, a description of the nature of one series of balls will suffice for the other.

The two surfaces 30 and 58 against which the various balls 42 and 64, respectively, are seated are disposed in vertical opposition to each other so that the two series of balls which are securely held in their respective recesses in the base plate and indexing plate, respectively, are capable of mating register and contact with each other when the indexing plate which carries the upper series of balls 64 is moved to the lowered position in which it is fragmentarily illustrated in FIG. 6. When the indexing plate 50 is in the elevated position in which it is shown in FIGS. 2 and 5, the two series of balls are separated to such an extent that they clear each other and the indexing plate 50 is free to turn in either direction under manual control. Since the number of balls in the upper series is equal to the number of balls in the lower series, and since all of the balls are uniform in diameter, as well as being equally spaced from the central vertical axis of the plates 24 and 50, seating of the upper plate assembly upon the lower plate assembly involves a positioning of the balls of the two series in tangential relationship with each individual ball of one series engaging two adjacent balls of the other series as clearly shown in FIG. 6. The two plates 24 and 50 may thus be brought into just as many positions with reference to each other as there are balls in each series.

The number of balls in each series of balls may vary widely from a lower limit of three balls to an upper limit which is determined only by the effective diameter of the plates 24 and 50 and by the use of balls sufficiently large that the graduations which they create between them are at least perceptible and effective for seating purposes. Irrespective, however, of the particular number of balls employed in each series, or of the size thereof, the essential features of the invention are at all times preserved.

The balls 42 are disposed within the annular recess afforded by the surfaces 32 and 40 and they are arranged in a circular row with adjacent balls being in tangential contact. The balls make substantial point contact with the flat annular surface 32 of the base plate 18 and they are compressed inwardly against the cylindrical surface 40 by means of a clamping ring 80.

The clamping ring 80 is preferably formed of hardened steel and the inside diameter thereof is such that when the balls 42 are in position against the inclined surfaces 39 and 40, they also are in contact with the inside cylindrical surface 82 of the clamping ring 80 so that each of the balls is under three-point compression. The underneath or lower annular face of the clamping ring 80 seats squarely upon the land surface 30 so that the median plane of the ring extends precisely at a right angle to the vertical axis of the base plate 24.

The inside cylindrical surface 82 of the clamping ring 80, together with the surfaces 30 and 36, constitute, in effect, an annular trough which extends around the base plate 24 and within which the balls are securely and frictionally clamped, the clamping action being a powerful one and serving to an appreciable degree to inhibit circumferential shifting of the entire circular row of balls 42 within the trough. To further inhibit such circumferential shifting of the balls bodily as a unit, the trough contains a quantity of a low melting point substance which, in the installation procedure, is caused to flow into the trough in a molten state and assume a condition of equilibrium wherein the lower regions of the balls are embedded in the substance and the substance is bonded, not only to the balls, but also to the adjacent trough surfaces. Such a substance has been designated at 84 and the nature thereof, its manner of application, and the manner in which it is bonded to the trough surfaces will be described in detail presently.

The balls 42 and 64 are preferably in the form of commercially available steel bearing balls, such as are commonly used in connection with anti-friction bearings. Such balls are possessed of an extremely high degree of accuracy as regards their spherical contour and, in the manufacture thereof, permissible tolerances are on the order of 0.000001 inch as regards their diameter in any direction. A steel bearing ball, regardless of the hardness thereof, is possessed of a very small degree of elasticity. A solid spherical body having any degree of elasticity whatsoever, even to the extreme degree possessed by a body of elastomeric material, such as rubber, is not appreciably misshapen by the application of a moderate degree of compressional force thereto at diametrically opposed regions. If the compressing media presents planar contact faces, as for example, the inside clamping surfaces of a vise, initial application of compressional forces to the spherical body from opposite sides thereof will merely create oppositely disposed small area flats on the surface of the sphere. The infinitesimal amount of displaced metal will scarcely disturb the molecular disposition of the remainder of the sphere and, except for the minute flats mentioned above, the outer surface of the sphere will remain truly spherical. Where tangentially arranged balls under compression are concerned, the flats existing between the balls at the regions of tangency are even smaller than they are in the case of planar pressure surfaces.

In the application of the balls to the base plate 24, the requisite number of balls are loosely positioned on the land surface 30 in their approximate positions of tangency and they are confined on the surface 30 by means of the clamping ring 80 which loosely surrounds them. Assuming for purposes of discussion that the balls 42 are caused to align themselves on the annular surface 30 so as to form a precise circular row of tangentially arranged balls, the selected number of balls and the selected diameter of the individual balls is such that there will be a slight clearance between each ball and the adjacent cylindrical surface 40. Such a clearance will be extremely small and may be measured in millionths of an inch. With the balls thus loosely positioned on the surface 30, the clamping ring 80 is then applied over the balls in such a manner as to force the same radially inwardly against the cylindrical surface 40 and close the gap so that all of the balls in the circular row of balls make tangential as well as point contact with this surface. The inward pressure applied to the balls 42 by the clamping ring 80 causes the various tangentially disposed balls to exert pressure upon one another in a circumferential direction, thus establishing the previously described relatively small microscopic flats on the various balls at the regions of tangency.

After the balls 42 have been assembled on the base plate 24 in the manner just described with the clamping ring 80 in position and surrounding the balls, the substance 84 in its molten state is poured into the trough in which the balls are disposed, the quantity of the substance so poured being of such magnitude that an annular pool of the molten substance will be created with the level of the pool falling a slight distance above the centers of the balls. Upon cooling and consequent solidification of the substance 84, the balls will be securely anchored in position within the trough against any possibility of circumferential shifting.

To prevent circumferential shifting of the entire mass of the substance 84, together with the partially embedded balls 42, a plurality of small sockets 86 are formed in the land surface 30 at spaced regions therearound. The molten substance 84 flows into these small sockets as shown in FIG. 3 and, upon solidification of the substance, the socket walls afford the necessary reaction surfaces to preclude any circumferential shifting of the hardened annulus within the trough. An annular groove 88 on the inside face of the ring 80 further interlocks the hardened substance with the ring 80 and anchors it within the trough.

While various substances may be found suitable as a bonding agent for the balls 42 and 64, the substance known as "Cerobend," and which is manufactured by Sterling Products Company of Chicago, Illinois, is admirably adapted for such use. This material has a melting point of approximately 190° F. (which is below the boiling point of water) and, therefore, it may be poured into the trough which contains the balls without necessitating heating of the base plate 24 or the balls 42 above room temperature. When so poured, the material will flow into the various interstices established by the row of balls and level off, so to speak, above the medial diametric plane of the balls. The material "Cerobend" possesses an extremely high degree of hardness when solidified and, in this respect, it differs from ordinary lead, Babbitt, solder and similar low melting point metals or alloys. It is particularly well suited as a bonding agent in the present instance inasmuch as, unlike solder, it will not adhere to steel. It may, therefore, be poured directly over the balls 42 without wetting the same and, because of its high specific gravity, it will flow from the upper regions of the balls and seek the previously indicated lower level above the median horizontal plane thereof. Thus, after pouring of the substance 84 and solidification thereof, the upper regions of the balls 42 are uncontaminated with the substance and they remain clean and exposed for cooperation with the similarly exposed regions of the balls in the series 64 thereabove.

The procedure involved in assembling the various balls 42 on the lower base plate 24 may be followed for assembly of the balls 64 on the upper indexing plate 50, utilizing a clamping ring 90 which is substantially identical with the clamping ring 80. The wall surfaces 56 and 58 are similar to the wall surfaces 36 and 30, respectively, and the assembly may be made on a work bench with the surface 58 facing upwardly.

The factors which ordinarily tend to cause circumferential shifting of either series of balls 42 or 64 within their respective troughs will vary according to the manual or automatic controls which are provided for performing the indexing operations, i.e., raising and lowering of the indexing plate 50 relatively to the base plate 24, and effecting turning movements of the indexing plate. In the present illustrated form of the indexing fixture 10, manual means are provided for shifting the indexing plate 50 vertically in opposite directions between a raised position wherein the upper series of balls 64 clear the lower series of balls 42 to permit manual turning of the indexing plate in either direction of rotation for indexing purposes, and a lowered position wherein the upper series of balls seat tangentially on the lower series of balls with the plate being effectively locked in such lowered position. Accordingly, the lower region of the base casting 18 is formed with a radially extending bore 100 on one side thereof and this bore communicates with the central socket 20. A similar radially extending bore 102 is provided on the other side of the socket in diametrical alignment with the bore 100. Rotatably journalled in, and projecting completely through, the two aligned bores 100 and 102 is an operating shaft 104 having a manipulating handle 106 on one projecting end thereof and a limit collar 108 on the other projecting end thereof. The limit collar 108 is designed for cooperation with a stop pin 110 in restricting rotational movement of the shaft 104 to approximately 180° in either direction under the control of the handle 106.

The shaft 104 extends across the circular socket 20 and it is provided with a pair of spaced apart eccentric cam lobes 112 and a medial eccentric cam lobe 114. The three lobes are eccentric in the same direction. The two lobes 112 function as plate-lifting lobes for raising the indexing plate 50 to its raised position, while the lobe 114 functions as a plate-locking lobe for securing the indexing plate in its lowered position in any selected position of indexing adjustment.

A cylindrical thrust ring 120 is slidably disposed within the central bore 28 of the base plate 24. The upper circular rim 124 of the thrust ring 120 is formed with an annular groove 126 therein within which there is disposed an anti-friction bearing assembly 128. The bearing assembly 128 is interposed between the upper rim 124 of the ring 120 and the underneath face 130 of the indexing plate 50. When the manipulating handle 106 is turned so that the cam lobes 112 are in their uppermost position, the indexing plate 50 will assume its elevated position wherein the balls 64 clear the balls 42 and the indexing plate is free to be rotated manually in either direction. When the manipulating handle 106 is turned so that the cam lobes 112 are in their lowermost positions, the indexing plate 50 will assume its lowered position with the balls 64 resting tangentially upon the balls 42 in a selected position of indexing adjustment.

Means are provided for securely locking the indexing plate 50 in its lowered position. Accordingly, the cam lobe 114 is surrounded by a cage-like structure 150 which is of rectangular design and which is secured by a threaded stud 152 to the lower end of a vertical pull rod 154. The upper end of the pull rod 154 projects through the indexing plate 50 and terminates within a centrally disposed circular socket in the upper side of the plate. The upper end of the pull rod 154 is provided with a head or lateral flange 158 which overlies an anti-friction bearing 160 on the bottom wall of the socket 156. As shown in FIG. 3, when the manipulating handle 106 is so disposed that the cam lobe 114 is in its lowermost position, the same will make camming engagement with the upwardly facing inside surface 162 of the cage-like structure 150 and cause a downward thrust to be applied to the bearing 160, and consequently to the indexing plate 50 as a whole so that the bearing will be under compression while the pull rod will be under tension. The net result of such tensional and compressional forces is to apply a slight compression to the balls 64 and 42, thus locking the indexing plate against turning movement relative to the base plate 24.

A combined dust guard apron and scale ring 170 surrounds and is suitably secured to the peripheral region of the indexing plate 50. The apron depends below the level of the clamping ring 90 and partially overhangs the clamping ring 80. The lower edge of the apron is in close proximity to the outer cylindrical surface of the latter ring 80 and serves to exclude the entrance of dust, dirt and other foreign material from the interior of the fixture 10 where the operative working parts of the same are disposed. A suitable scale 172 which may be graduated in angular degrees or fractions thereof may be inscribed on the lower region of the apron 170 for cooperation with a suitable pointer 174 which may be inscribed on the clamping ring 38.

In the operation of the fixture 10, assuming the parts to be in the locked position in which they are illustrated in FIG. 6, when it is desired to alter the setting of the indexing plate 50 relatively to the base plate 24, it is merely necessary for the operator to engage the manipulating handle 106 and turn the same in a direction to move the two cam lobes 112 to the uppermost position of which they are capable of assuming. This movement of the cam lobes exerts a camming action on the underneath annular face of the thrust ring 120 and causes the thrust ring to be elevated. Elevation of the thrust ring 120 exerts an upward thrust on the upper indexing plate 50 through the medium of the anti-friction bearing assembly 160 so that the plate is elevated to the position wherein it is shown in FIGS. 2 and 5. In this elevated position of the indexing plate 50, the two series of balls 42 and 64 clear each other so that it is possible manually to turn the indexing plate into any desired angular position and in either direction.

As soon as the indexing plate 50 has been turned to the desired position of angular adjustment, the handle 106 may be manipulated to cause the cam lobes 112 to move downwardly and release the upper indexing plate which follows the movements of the cam lobes and descends upon the base plate 24. At such time as the two sets of balls 42 and 64 move into operative contact for accurate angular locating purposes, the medial cam lobe 114 exerts downward pressure on the surface 162 of the cage-like structure 150 and thus applies tension to the pull rod 154 to lock the plates 24 and 50 in place.

Various forms of actuating mechanisms other than the form illustrated herein may be employed for effecting indexing operations and attaining the necessary vertical movements of the indexing plate 50 relative to the base plate 24 including power driven pneumatic or hydraulic means if desired.

It has been found that in connection with indexing mechanisms of the type herein described and employing two mating series of circularly arranged balls, extreme difficulty has been encountered in preventing circumferential shifting of one or both series of balls bodily as a unit around the trough or channel in which the balls are seated or clamped. This is true in connection with indexing mechanism employing the herein described clamping means and, despite the powerful clamping action exerted by the clamping rings 80 and 90, it has been found that the cumulative camming thrust which is exerted by the contacting pairs of balls of the two series of balls is sufficiently great as to effect small increments of circumferential shifting of one or the other set of balls, or of both sets, each time the indexing plate 50 is caused to descend upon the base plate 24. This circumferential shifting of the balls collectively is cumulative insofar as successive indexing operations are concerned and, after a period of prolonged use of the fixture, the accumulated displacements are apparent and the indexing errors involved are such as to necessitate a time-consuming readjustment of the positions of the balls including a complete dismantling of the mechanism. Where power-actuated mechanism is employed for effecting indexing operations involving an increased impact between the balls incident to the use of increased force, a single indexing operation may be sufficient to cause circumferential offset of the balls.

From the above description it will be apparent that, due to the fact that the substance 84 which partially fills the annular troughs in which the two sets of balls 42 and 64, respectively, are disposed, is relatively hard in its solid state, and due to the fact that a major portion of each ball is embedded in this substance, there can be no shifting of either series of balls within the confines of the substance itself. Due to the interlocking engagement between the hardened annulus of the substance and the walls of the trough in which the annulus is seated, there can be no circumferential shifting of the hardened annulus within the trough. The annular grooves 88 in the two clamping rings serve to hold the two clamping rings against outward movements in the troughs.

The invention is not to be limited to the exact arrangement of parts shown in the accompanying drawings or described in this specification and modifications may be resorted to within the scope of the appended claims.

Having thus described the invention what we claim as new and desire to secure by Letters Patent is:

1. An indexing mechanism comprising a base plate, an indexing plate positioned in opposed relation with the base plate and rotatable relatively to the latter about a central axis at right angles to the two plates, said base and indexing plates being relatively movable toward and away from each other in an axial direction between proximate and remote positions, means on each of the opposed faces of the plates defining a circular channel in concentric relation with said axis, the radii of curvature of the two channels being equal whereby the channels are in register throughout, an arcuate major circle sector row of hard spherical balls disposed in each channel, all of said balls being of equal diameter and the balls of each row being equal in number, the adjacent balls of each row being in mutual tangential contact, the rows associated with the two plates being adapted to interfit with each other when the plates are in their proximate positions with the balls thereof in mutual contact in a common plane, and a homogeneous hard bonding substance disposed within each channel and partially filling the same, a major portion of each ball being embedded in said bonding substance.

2. An indexing mechanism comprising a base plate, an indexing plate positioned in opposed relation with the base plate and rotatable relatively to the latter about a central axis at right angles to the two plates, said base and indexing plates being relatively movable toward and away from each other in an axial direction between proximate and remote positions, means on each of the opposed faces of the plates defining a circular channel in concentric relation with said axis, the radii of curvature of the two channels being equal whereby the channels are in register throughout, an arcuate major circle sector row of hard spherical balls disposed in each channel, all of said balls being of equal diameter and the balls of each row being equal in number, the adjacent balls of each row being in mutual tangential contact, the rows associated with the two plates being adapted to interfit with each other when the plates are in their proximate positions with the balls thereof in mutual contact in a common plane, and a homogeneous hard bonding substance disposed within each channel, completely filling the lower regions of the channel, partially filling the upper region of the channel, and serving to encompass a major portion of each ball which is disposed within the channel.

3. An indexing mechanism comprising a base plate, an indexing plate positioned in opposed relation with the base plate and rotatable relatively to the latter about a central axis at right angles to the two plates, said base and indexing plates being relatively movable toward and away from each other in an axial direction between proximate and remote positions, means on each of the opposed faces of the plates defining a circular channel in concentric relation with said axis and presenting opposed channel side walls and a channel bottom wall, the radii of curvature of the two channels being equal whereby the channels are in register throughout, an arcuate major circle sector row of hard spherical balls disposed in each channel, all of said balls being of equal diameter and the balls of each row being equal in number, the adjacent balls of each row being in mutual tangential contact, the rows associated with the two plates being adapted to interfit with each other when the plates are in their proximate positions with the balls thereof in mutual contact in a common plane, one wall of each channel being formed with a lateral reaction pocket therein, and a low melting point, hardened bonding substance disposed within each channel, completely filling the lower region of the channel and the reaction pocket, partially filling the upper region of the channel, and serving to encompass a major portion of each ball which is disposed within the channel, said bonding substance and the material of which said balls are formed being substantially devoid of molecular affinity for each other.

4. An indexing mechanism comprising a base plate, an indexing plate positioned in opposed relation with the base plate and rotatable relatively to the latter about a central axis at right angles to the two plates, said base and indexing plates being provided with means whereby they are relatively movable toward and away from each other in an axial direction between proximate and remote positions, means on each of the opposed faces of the plates and in the form of a cylindrical surface and a flat surface at right angles to the cylindrical surface defining a circular recess concentric with said axis, the radii of curvature of the two recesses being equal whereby the recesesses are in register throughout, an arcuate major circle sector row of hard spherical balls disposed in each recess, all of said balls being of equal diameter and the balls of each row being functionally equal in number, the adjacent balls of each row being in mutual tangential contact, the rows of balls associated with the two plates, respectively, being adapted to interfit with each other when the plates are in their proximate position with each ball in a row contacting the adjacent balls in the other row, a clamping ring concentric with and extending around each arcuate row of balls and serving, in combination with the cylindrical surface of the associated plate, to compress the balls of said row therebetween, said clamping ring, in combination with the adjacent recess, defining a circular channel within which the balls of the rows are confined, and a homogeneous hard bonding substance disposed within said channel and partially filling the same, a major portion of each ball being embedded in said bonding substance.

5. An indexing mechanism comprising a base plate, an indexing plate positioned in opposed relation with the base plate and rotatable relatively to the latter about a central axis at right angles to the two plates, said base and indexing plates being provided with means whereby they are relatively movable toward and away from each other in an axial direction between proximate and remote positions, means on each of the opposed faces of the plates and in the form of a cylindrical surface and a flat surface at right angles to the cylindrical surface defining a circular recess concentric with said axis, the radii of curvature of the two recesses being equal whereby the recesses are in register throughout, an arcuate major circle sector row of hard spherical balls disposed in each recess, all of said balls being of equal diameter and the balls of each row being functionally equal in number, the adjacent balls of each row being in mutual tangential contact, the rows of balls associated with the two plates, respectively, being adapted to interfit with each other when the plates are in their proximate position with each ball in a row contacting the adjacent balls in the other row, a clamping ring concentriic with and extending around each arcuate row of balls and serving, in combination with the cylindrical surface of the associated plate, to compress the balls of said row therebetween, said clamping ring, in combination with the adjacent recess, defining a circular channel within which the balls of the rows are confined, and a homogeneous hard bonding substance disposed within said channel, completely filling the lower region thereof, partially filling the upper region thereof, and serving to encompass a major portion of each ball of said row.

6. An indexing mechanism comprising a base plate, an indexing plate positioned in opposed relation with the base plate and rotatable relatively to the latter about a central axis at right angles to the two plates, said base and indexing plates being provided with means whereby they are relatively movable toward and away from each other in an axial direction between proximate and remote positions, means on each of the opposed faces of the plates and in the form of a cylindrical surface and a flat surafce at right angles to the cylindrical surface defining a circular recess concentric with said axis, the radii of curvature of the two recesses being equal whereby the recesses are in register throughout, an arcuate major circle sector row of hard spherical balls disposed in each recess, all of said balls being of equal diameter and the balls of each row being functionally equal in number, the adjacent balls of each row being in mutual tangential contact, the rows of balls associated with the two plates, respectively, being adapted to interfit with each other when the plates are in their proximate position with each ball in a row contacting the adjacent balls in the other row, a clamping ring concentric with and extending around each arcuate row of balls and serving, in combination with the cylindrical surface of the associated plate, to compress the balls of said row therebetween, said clamping ring, in combination with the adjacent recess, defining a circular channel within which the balls of the rows are confined, and a homogeneous hard bonding substance disposed within said channel, completely filling the lower region thereof, partially filling the upper region thereof, and serving to encompass a major portion of each ball of said row, said bonding substance and the material of which said balls are formed being substantially devoid of molecular affinity for each other.

7. An indexing mechanism comprising a base plate, an indexing plate positioned in opposed relation with the base plate and rotatable relatively to the latter about a central axis at right angles to the two plates, said base and indexing plates being provided with means whereby they are relatively movable toward and away from each other in an axial direction between proximate and remote positions, means on each of the opposed faces of the plates and in the form of a cylindrical surface and a flat surface at right angles to the cylindrical surface defining a circular recess concentric with said axis, said cylindrical surface being formed with a V-groove therearound, the radii of curvature of the two recesses being equal whereby the recesses are in register throughout, an arcuate major circle sector row of hard spherical balls disposed in each recess, all of said balls being of equal diameter and the balls of each row being functionally equal in number, the adjacent balls of each row being in mutual tangential contact, the rows of balls associated with the two plates, respectively, being adapted to interfit with each other when the plates are in their proximate position with each ball in a row contacting the adjacent balls in the other row, a clamping ring concentric with and extending around each arcuate row of balls and serving, in combination with the side walls of the V-groove of the associated plate, to compress the balls of said row therebetween, said clamping ring, in combination with the adjacent recess, defining a circular channel within which the balls of the row are confined, and a homogeneous hard bonding substance disposed within said channel and partially filling the same, a major portion of each ball being embedded in said bonding substance.

8. An indexing mechanism comprising a base plate, an indexing plate positioned in opposed relation with the base plate and rotatable relatively to the latter about a central axis at right angles to the two plates, said base and indexing plates being relatively toward and away from each other in an axial direction and between proximate and remote positions, means on each of the opposed faces of the plates defining a circular channel in concentric relation with said axis, the radii of curvature of the two channels being equal in order that the channels are in registry with one another, a substantially continuous circular row of hard spherical contacting balls disposed in each channel, all of the balls being of equal diameter, the rows associated with the two plates being adapted to interfit with each other when the plates are in their proximate position with the balls thereof in mutual contact in a common plane, and a homogeneous hard bonding substance disposed in one of the channels and partially filling the latter, a portion of each ball in said one channel being embedded in said bonding substance in order that the row of balls in said one channel is positively held against circumferential displacement in its channel.

References Cited in the file of this patent
UNITED STATES PATENTS

| | | |
|---|---|---|
| 2,233,950 | Lepetit | Mar. 4, 1941 |
| 2,901,914 | Preston | Sept. 1, 1959 |
| 2,921,487 | Schabot | Jan. 19, 1960 |